Aug. 17, 1926.
E. R. BURTNETT
1,596,398
INTERNAL COMBUSTION ENGINE
Filed August 2, 1923  4 Sheets-Sheet 1
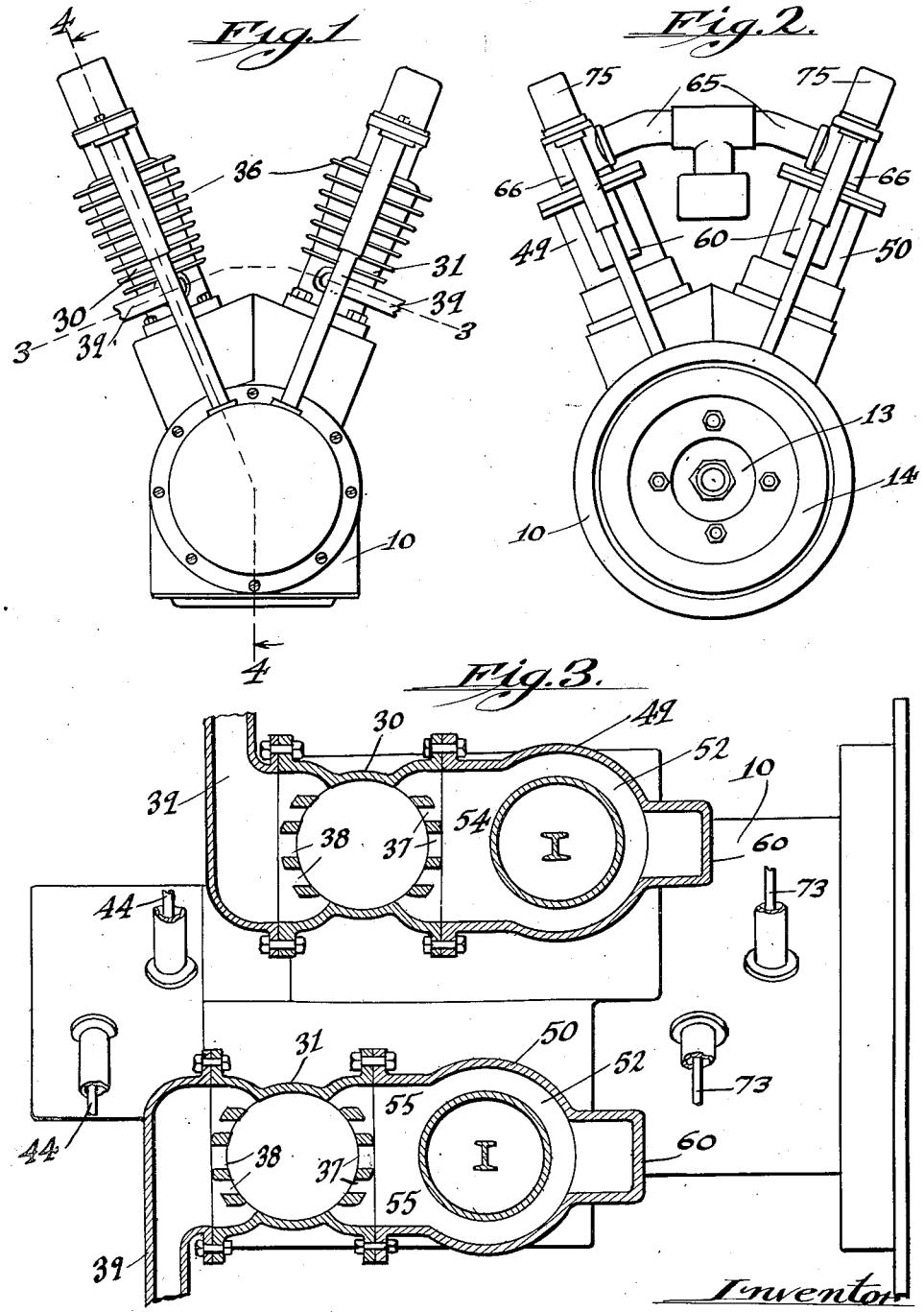

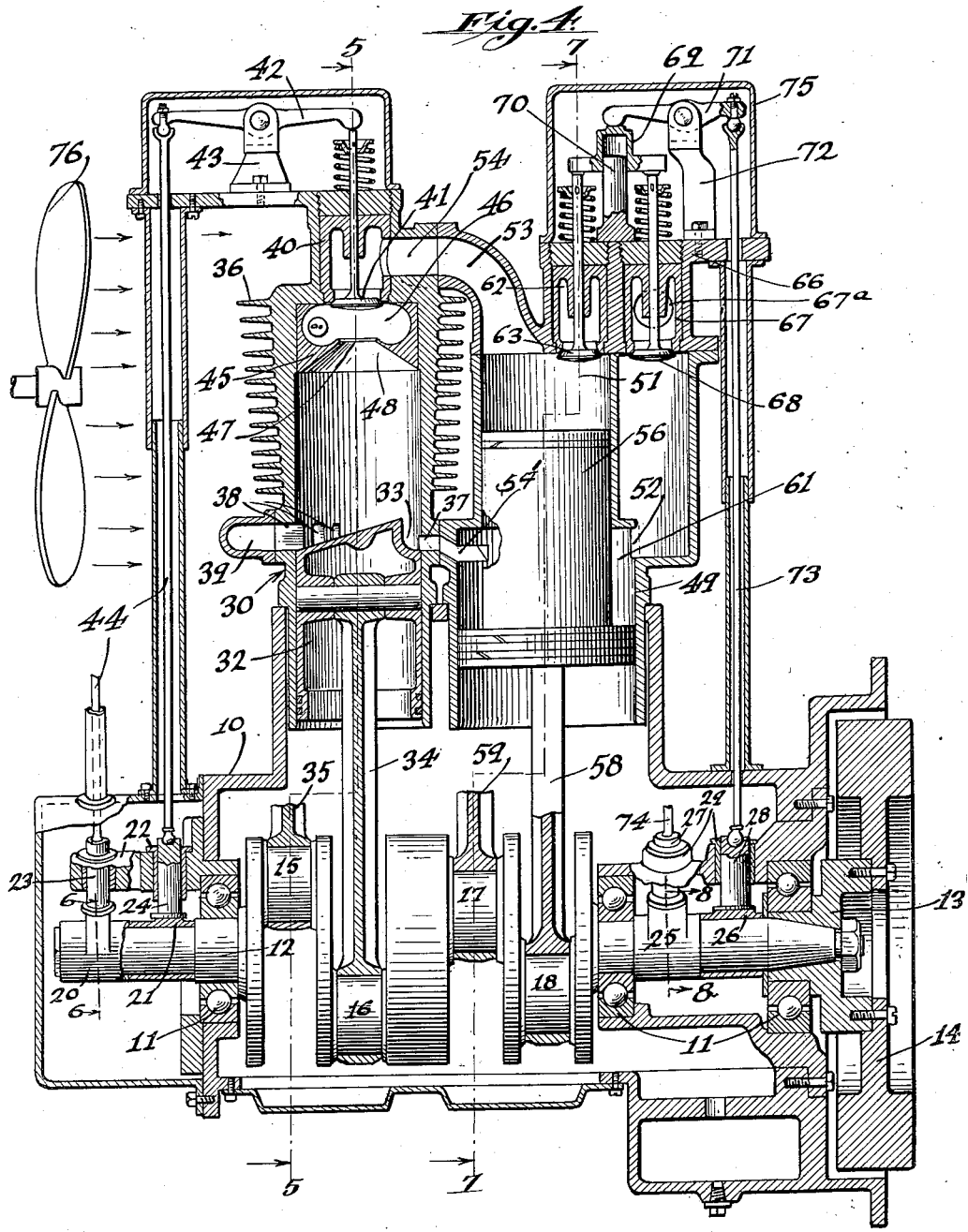

Aug. 17, 1926.

E. R. BURTNETT 1,596,398

INTERNAL COMBUSTION ENGINE

Filed August 2, 1923    4 Sheets-Sheet 3

Inventor:
EVERETT R. BURTNETT

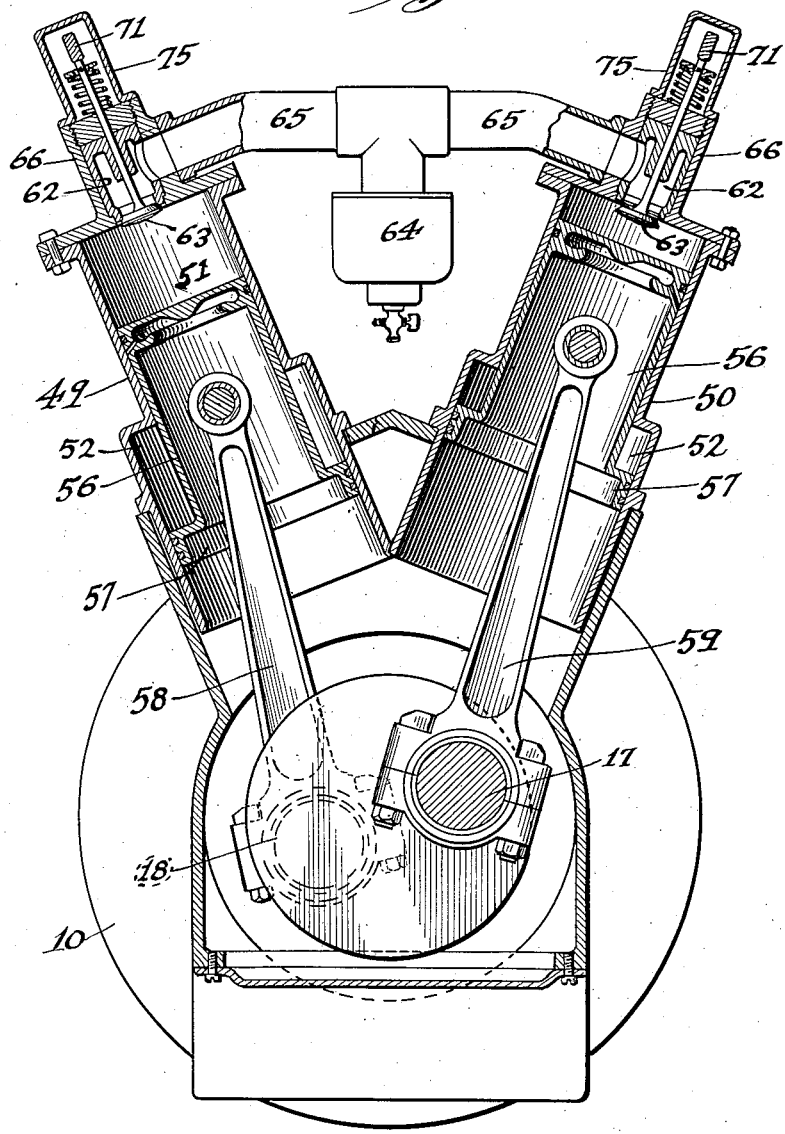

Patented Aug. 17, 1926.

1,596,398

UNITED STATES PATENT OFFICE.

EVERETT R. BURTNETT, OF LOS ANGELES, CALIFORNIA, ASSIGNOR, BY DIRECT AND MESNE ASSIGNMENTS, TO THE AUTOMOTIVE VALVES CO., OF LOS ANGELES, CALIFORNIA, A VOLUNTARY TRUST.

INTERNAL-COMBUSTION ENGINE.

Application filed August 2, 1923. Serial No. 655,267.

My invention relates to improvements in internal combustion engines of the air cooled, two stroke cycle type and among the principal objects of my invention is, the provision of co-operating means and arrangements for accomplishing the various functions necessary to obtain highly efficient and enduring operation in power development from a two stroke cycle internal combustion engine; to provide an improved charge functional cycle in which a constant, cool, inert volume is utilized for effectively scavenging from the combustion chamber, the residual products resulting from internal combustion and expansion, and which action is followed by a charging of the combustion cylinder with a constant fresh inert volume of maximum weight, as an initial combustion cylinder charge and, further, to provide means for super inducting into the combustion cylinder, a gaseous mixture charge that is variable in volume by throttle control and which provides an additional quantity or volume to the initially charged inert volume.

Further objects of my invention are, to minimize vibration by the provision of a relatively simple and cheaply produced engine structure having the combustion and charge cylinders arranged so that the cranks of the crank shaft may be spaced at equal distances apart throughout the 360° of the crank throw circle, and, to provide an engine having relatively few essential parts, the total number of the latter being less than is required in conventional engines, and said parts being combined so as to co-operate in developing an increase in functions that tend to materially enhance engine efficiency.

A further object of my invention is, to provide an engine having the combustion cylinders arranged so that those portions or parts that are subjected to the greatest heat are foremost and equal in the path or flow of a draught of cooling air, the latter being mechanically directed toward and about the entire engine structure, thereby providing an engine that is externally air cooled.

This action combined with the internal cooling of the combustion chamber, valves and valve actuating parts by the cool inert volume inducted into the engine during the charging cycle results in increased effectiveness of engine operation.

A still further object of my invention is to provide an internal combustion engine of the two stroke cycle type, wherein each displacement charge function necessary to complete the cycle, is of maximum volumetric efficiency, being the result of full induction period duration of open port action through the use of properly timed valves.

My invention contemplates a simple and practical combination of the best mechanical and functional practices and principles in engine design in both two and four types, with an additional event included in the cycle of operation.

The invention as herein disclosed, embodies improved means for actuating certain parts, and an improved cycle of functional operation, whereby a higher compression pressure is obtained during idling or "loafing" range of operation, with an increase in thermal efficiency and "heat to power" conversion.

Still further objects of my invention are, to obtain fuel load operation and higher compression pressures with less internal volume temperatures and initial combustion pressure and, with increased volume combustion cylinder clearance to extend throughout the crank arc of leverage, which produces a greater mean pressure, to obtain constant inert initial charge induction to the combustion chamber, and to provide for a more perfect dual character charge stratification so as to eliminate the principal causes for the phenomenon, detonation.

With the foregoing and other objects in view, my invention consists in certain novel features of construction and arrangement of parts that will be hereinafter more fully described and claimed and illustrated in the accompanying drawings in which:

Fig. 1 is a front elevational view of my improved engine.

Fig. 2 is a rear elevational view.

Fig. 3 is an enlarged horizontal section taken on the line 3—3 of Fig. 1.

Fig. 4 is an enlarged section taken on the line 4—4 of Fig. 1.

Fig. 7 is a vertical section taken on the line 7—7 of Fig. 4.

Fig. 8 is a detail section taken on the line 8—8 of Fig. 4.

Figure 5:
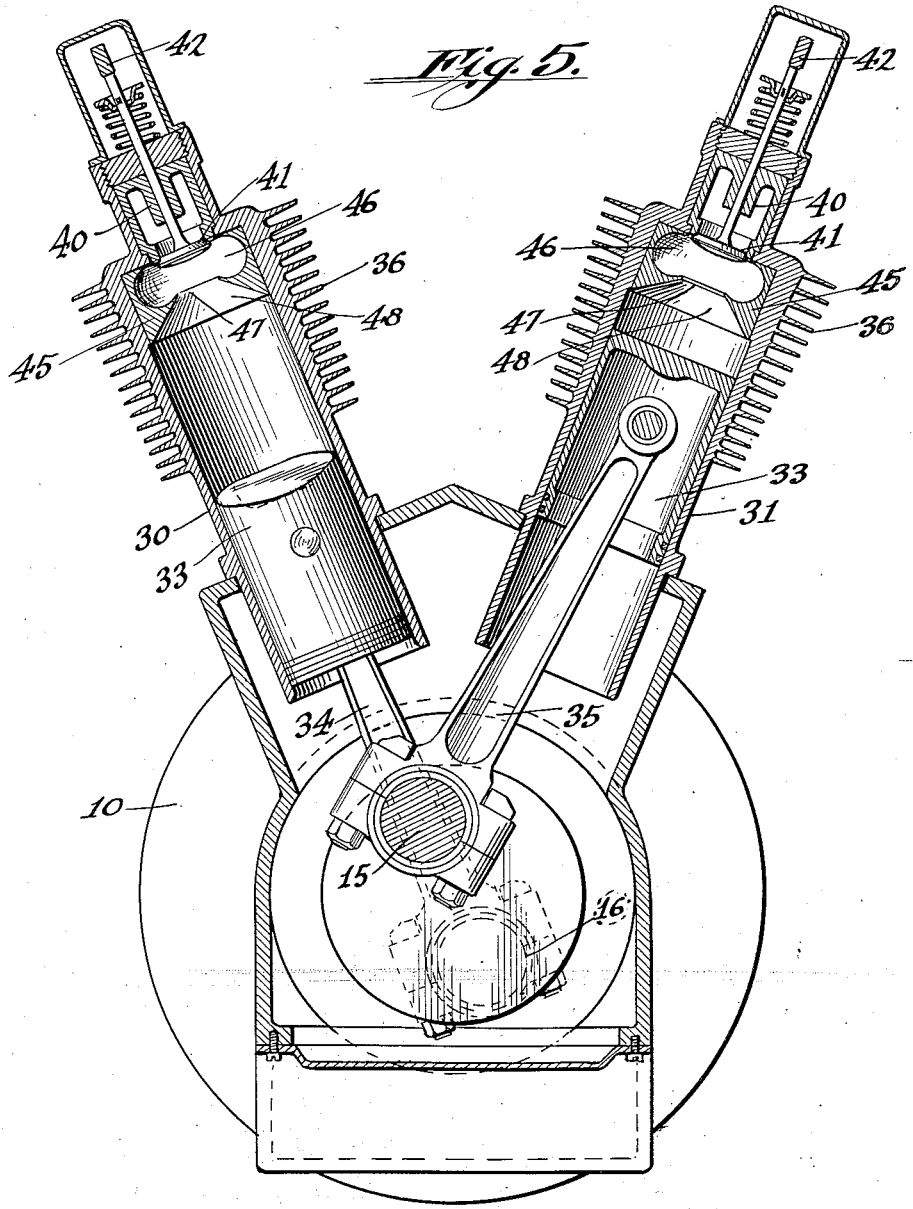
Fig. 5 is a vertical section taken on the line 5—5 of Fig. 4.
Figure 6:
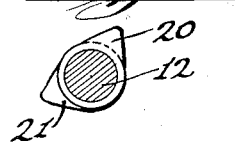
Fig. 6 is a detail sectional view taken on the line 6—6 of Fig. 4.

Referring by numerals to the accompanying drawings, 10 designates a suitably formed crank case, in which is arranged bearings 11, preferably of the ball or roller anti-friction type, for a crank shaft 12.

Secured to the rear end of the crank shaft 12 is a flange 13 to which may be bolted a fly wheel 14.

The front portion of shaft 12 is formed with two cranks 15 and 16 that are arranged 180° apart and immediately to the rear of these cranks is a second pair of cranks 17 and 18 that are arranged 180° apart and being disposed at right angles to said cranks 15 and 16. Thus the four cranks are disposed at equal distances, or 90° apart, around the full circle of the crank throw or travel.

Arranged on the crank shaft 12 in front of the cranks 15 and 16 is a pair of cams 20 and 21, the same being suitably spaced apart and bearing thereon and arranged to slide through suitable bearings 22 are plungers 23 and 24 respectively.

Arranged on the crank shaft 12 to the rear of the cranks 17 and 18 are suitably spaced cams 25 and 26 and bearing thereon are the lower ends of plungers 27 and 28 respectively that are arranged for sliding movement in suitable bearings 29.

Secured in any suitable manner on top of the front portion of crank case 10 is a pair of combustion cylinders 30 and 31, the axes of which are radial with respect to the axis of the crank shaft 12 and said cylinders occupying positions on opposite sides of a vertical plane that passes through the axis of said crank shaft. Thus these combustion cylinders are disposed in V-arrangement and, in addition, they are offset slightly with respect to each other lengthwise of the crank shaft so as to position the axis of the cylinder 30 in alignment with the center of crank 16 and the axis of cylinder 31 in alignment with the center of crank 15.

Arranged for reciprocatory movement within each combustion cylinder is a piston such as 32 and each having formed on its head or upper face near one side, an abrupt shoulder 33 that serves to deflect compressed air that enters the cylinders, upwardly through one side of the piston clearance chamber to effect the scavenging thereof.

The piston in cylinder 30 is connected to crank 16 by a connecting rod 34 and the piston in cylinder 31 is connected to crank 15 by a connecting rod 35 Fig. 5.

The upper portions of cylinders are provided with heat radiating fins 36 and formed in the intermediate portion of each cylinder and in a plane where they are wholly uncovered only when the piston is at the lower or outer end of its stroke, are scavenging volume inlet ports 37 and exhaust ports 38.

The exhaust ports 38 are wider than the inlet ports 37 so that as the piston travels to the lower or outer end of its stroke, the exhaust ports are uncovered and partially open before the inlet ports are uncovered.

Suitable exhaust pipes 39 lead from each set of exhaust ports.

Removably arranged in the head of each combustion cylinder is a valve cage 40 having, at its lower end, a seat for an inwardly opening spring-held poppet valve 41.

Bearing on the upper end of the stem of each valve is the inner end of a rocker arm such as 42 that is fulcrumed on a bracket 43, and bearing against the under side of the outer end of each rocker arm is a push rod such as 44.

The lower end of the push rod that actuates the rocker arm on top of cylinder 30 bears on the upper end of plunger 24 and the lower end of the push rod associated with the rocker arm on cylinder 31, bears on the upper end of plunger 23. The rocker arms and push rods are preferably enclosed in suitable housings as illustrated in Fig. 4.

Removably positioned in the upper end of the chamber within each combustion cylinder is a block 45, having formed in its upper portion an annular chamber 46, the upper end thereof communicating directly with the opening at the lower end of the valve cage 40 and which is controlled by valve 41 and by means of a relatively small centrally arranged opening 47, said chamber 46 communicates directly with the upper end of a substantially flat conical throat 48 that is formed in the lower portion of block 45 and which opens directly into the upper end of the piston clearance chamber.

Arranged on top of the crank case to the rear of the combustion cylinders 30 and 31 are compression or pumping cylinders 49 and 50.

Cylinder 49 occupies the same radial plane with combustion cylinder 30 and cylinder 50 occupies the same radial plane with the combustion cylinder 31.

Each pumping cylinder has a two-diameter bore, thereby forming in the upper portion of each cylinder, a gaseous fuel compression chamber 51 and a scavenging volume compression chamber 52 of larger diameter in the lower portion of said cylinder.

The upper end of the chamber 51 in cylinder 49 communicates by means of a duct 53 with a port 54 that leads into the valve cage 40 in the top of combustion cylinder 30 and, by a similar duct and port, the fuel compression chamber in cylinder 50 communicates with the inlet valve chamber in the head of combustion cylinder 31.

Formed through the wall of cylinder 49 at the upper end of the large chamber 52 therein is a port 54 that communicates with ports 37, and a similar port 55 establishes communication between the larger compression chamber in cylinder 50 with the ports 37 in combustion cylinder 31.

Arranged for operation within each compression or pumping cylinder is a two diameter piston the smaller upper portion 56 thereof occupying the compression chamber 51 of least diameter and the larger lower portion 57 occupying the lower larger compression chamber 52.

The pumping piston 56 in cylinder 49 is connected to crank 18 by a connecting rod 58 and a similar rod 59 connects the pumping piston in cylinder 50 to crank 17.

Formed on the rear side of the upper portion of each pumping cylinder is a box-like housing 60 and leading from the lower end of the chamber therein through the wall of the corresponding pumping cylinder so as to admit a volume of inert air or cooled products of combustion into the upper end of the corresponding pumping chamber 52, is an inlet port 61.

Seated in the heads of the pumping cylinders to the rear of the ducts 53 are valve cages such as 62, the lower ends thereof having seats for inwardly opening spring held poppet valves 63.

Leading from a suitable source of gaseous fuel supply, for instance a carburetor 64, to inlet ports in the valve cages 62 above the valves therein are gaseous fuel supply pipes 65.

Arranged in the head or block 66 that serves as a closure for the upper ends of the housings 60 and directly above the chambers within said housings, are valve cages 67 that are provided at their lower ends with seats for inwardly opening spring-held poppet valves 68.

Entering the chambers within these valve cages above the valve seats at the lower ends thereof are suitably located air inlet ports 67ª.

The upper ends of the stems of each pair of the valves 63 and 68 are engaged by a cross-head such as 69 that is arranged for sliding movement upon a post 70.

Bearing on top of each cross-head is the inner end of a rocker arm such as 71, that is fulcrumed on a suitable bracket such as 72.

The outer end of one of these rocker arms is engaged by the upper end of a push rod 73, the lower end thereof bearing on top of plunger 28 and the upper end of a similar push rod 74 bears against the outer end of the other rocker arm 71 and, at its lower end, on top of plunger 27.

Each push rod and associated rocker arm and cross-head may be enclosed in a suitable housing such as 75.

A suitably driven fan such as 76, may be mounted directly in front of the upper portions of the combustion cylinders so as to throw currents of cooling air directly over the combustion cylinders and past the compression cylinders located to the rear thereof.

In the operation of my improved engine it will be understood that the pumping piston within cylinder 49 serves to compress and pump gaseous fuel and air or cooled products of combustion to combustion cylinder 30 and that the piston in cylinder 50 serves in a similar capacity for combustion cylinder 31.

As each combustion cylinder piston approaches the outer or lower end of its stroke the corresponding exhaust ports 38 will be uncovered thereby permitting a substantial portion of the burnt gases and products of combustion to exhaust through said open ports into the corresponding exhaust pipe 39.

As each combustion cylinder piston approaches low center, its companion pumping piston is approaching high center, due to the 90° arrangement of the respective cranks and inlet ports 37 are uncovered as the combustion piston passes low center, a charge of compressed air or cooled products of combustion from the upper portion of chamber 52 and above the portion 57 of the pumping piston, will pass through ports 54 and 37 and striking against the face or shoulder 33, will be deflected so as to pass upwardly through the side of the combustion chamber, opposite from the exhaust ports 38 and said blast of compressed air will drive before it practically all the burnt gases and products of combustion and force the same out through the exhaust ports 38.

As the piston in the combustion chamber starts upward the inlet ports 37 will be covered and closed an instant before the exhaust ports 38 are fully covered and closed and at this period in the operation the pressure within the combustion chamber is practically atmospheric.

Obviously, this blast of air or cooled products of combustion into and through the combustion chamber following each explosion, exerts a substantial internal cooling effect and this, combined with the external blasts of air from the fan directly onto and over the combustion cylinders, is effective in quickly disseminating the heat and reducing high temperatures, without resorting to the conventional circulating cooling fluid systems.

As the combustion cylinder piston moves upward the corresponding gaseous fuel inlet valve 41 is unseated and opened by its associated rocker arm 42, push rod 44, plunger 23 or 24, and cam 20 or 21, and a charge of gaseous fuel will be admitted to annular chamber 46 that is directly above the clearance chamber for the piston that is moving upwardly or inwardly.

This charge of gaseous fuel is highly compressed in chamber 51 of the companion pumping cylinder as the two diameter piston in the latter moves upwardly therein and said compressed fuel charge passes through duct 53, port 54, and past inlet valve 41.

Thus the admitted charge of fuel under pressure is admitted to the combustion chamber directly on top of the body or stratum of air or cooled products of combustion remaining in the chamber directly above the ascending piston and as the latter moves to top center or to the inner end of its stroke said gaseous fuel charge will be compressed in a stratum within chamber 46 and the volume of air or products of combustion will be compressed in a stratum in throat 48 and in the clearance in the combustion chamber above the piston.

During the latter portion of the upward movement of the piston and during the first portion of its subsequent downward power stroke, the companion pumping piston is moving downward, during which time inlet valves 63 and 68 are simultaneously opened by the corresponding cam 25 or 26, plunger 27 or 28, push rod 73, rocker arm 71 and cross-head 69, with the result that a charge of gaseous fuel is drawn into chamber 51, and a volume of atmospheric air or cooled products of combustion is drawn into the chamber within housing 60 and the annular chamber 52 above pumping piston member 57.

Obviously these charges of gaseous fuel and air are compressed on the succeeding upward stroke of the two diameter pumping piston. As the power piston passes high center or, an instant later, the compressed charge of gaseous fuel in chamber 46 will be ignited by means of a spark plug or other suitable ignition device, thereby producing expansion and the forces of the latter passing through opening 47 and throat 48 and acting through the stratum of compressed air will be directed against the head of the piston to drive the same downward on its power stroke.

Thus it will be seen that I have produced a relatively simple, practical and efficient two stroke cycle internal combustion engine that is air cooled, internally and externally, thereby counteracting the relatively high temperature ordinarily produced in the operation of internal combustion engines and which improved engine includes two pairs of cylinders, angularly disposed with respect to each other so as to permit the four cranks of the crank shaft to be arranged 90° apart thereby eliminating vibration while in operation and the two cylinders of each pair being disposed one directly behind the other and parallel with the crank shaft, which arrangement enables both combustion cylinders to be arranged in front, where they are subjected to all the cooling effect of the blasts of air from the fan.

A particularly desirable feature of my improved engine is the means and manner of simultaneous admission of gaseous fuel and an inert charge volume into the compression cylinder, the simultaneous compression of said air and inert charge and the subsequent time periods of admitting the compressed gaseous fuel into the combustion chamber.

The means employed for effecting these advantageous results, is relatively simple, may be easily and cheaply produced and results in relatively high efficiency and economy of engine operation.

It will be understood that minor changes in the size, form and construction of the various parts of my improved engine may be made and substituted for those herein shown and described without departing from the spirit of my invention, the scope of which is set forth in the appended claims.

I claim as my invention:—

1. An internal combustion engine having two combustion cylinders and two combustion cylinder charge pumping cylinders, the four cylinders being arranged in two units that are angularly disposed so as to form the wings of a V-cylinder structure, and with a combustion cylinder occupying the engine front end position in each wing and with a pumping cylinder occupying the rearward position in each wing.

2. An internal combustion engine having two combustion cylinders and two combustion cylinder charge pumping cylinders, the four cylinders being arranged in two units that are angularly disposed so as to form the wings of a V-cylinder structure, with a combustion cylinder occupying the engine front end position in each wing and with a pumping cylinder occupying the rearward position in each wing, and each unit wing of two cylinders being centered on a plane that is substantially parallel with the axis of the crank shaft that is associated with the engine.

3. An internal combustion engine having two combustion cylinders and two combustion cylinder charge pumping cylinders, the four cylinders being arranged in two units that are angularly disposed so as to form the wings of a V-cylinder structure, with a combustion cylinder occupying the engine front end position in each wing and with a pumping cylinder occupying the rearward position in each wing, each pumping cylinder having a two-diameter bore and a two diameter piston arranged for operation within said two diameter bore thereby providing in each pumping cylinder a cylinder head pumping chamber and a lower annular pumping chamber.

4. An internal combustion engine having two combustion cylinders and two combustion cylinder charge pumping cylinders, the four cylinders being arranged in two units that are angularly disposed so as to form the wings of a V-cylinder structure, with a combustion cylinder occupying the engine front end position in each wing and with a pumping cylinder occupying the rearward position in each wing, each pumping cylinder having a two-diameter bore, a two diameter piston arranged for operation within said two diameter bore thereby providing in each pumping cylinder a cylinder head pumping chamber and a lower annular pumping chamber, each combustion cylinder of each unit having ports formed in oppositely disposed portions of its wall and a piston arranged for operation within each combustion cylinder and adapted when passing crank end dead center to uncover and open said ports.

5. An internal combustion engine having two combustion cylinders and two combustion cylinder charge pumping cylinders, the four cylinders being arranged in two units that are angularly disposed so as to form the wings of a V-cylinder structure, with a combustion cylinder occupying the engine front end position in each wing and with a pumping cylinder occupying the rearward position in each wing, each pumping cylinder having a two-diameter bore, a two diameter piston arranged for operation within said two diameter bore thereby providing in each pumping cylinder a cylinder head pumping chamber and a lower annular pumping chamber, each combustion cylinder of each unit having ports formed in oppositely disposed portions of its wall, a piston arranged for operation within each combustion cylinder and adapted when passing crank end dead center to uncover and open said ports, one set of said ports functioning for the exhaust of products of combustion and the opposite set of ports being for the admission of a compressed inert volume that is effective in scavenging the combustion chamber of the products of combustion.

6. An internal combustion engine having two combustion cylinders and two combustion cylinder charge pumping cylinders, the four cylinders being arranged in two units that are angularly disposed so as to form the wings of a V-cylinder structure, with a combustion cylinder occupying the engine front end position in each wing and with a pumping cylinder occupying the rearward position in each wing, each pumping cylinder having a two-diameter bore, a two diameter piston arranged for operation within said two diameter bore thereby providing in each pumping cylinder a cylinder head pumping chamber and a lower annular pumping chamber, each combustion cylinder of each unit having ports formed in oppositely disposed portions of its wall, a piston arranged for operation within each combustion cylinder and adapted when passing crank end dead center to uncover and open said ports, one set of said ports functioning for the exhaust of products of combustion, the opposite set of ports being for the admission of a compressed inert volume that is effective in scavenging the combustion chamber of the products of combustion, and a valve controlled inlet port in the head of each combustion cylinder for the admission of a precompressed charge of gaseous fuel that forms a supercharge for the first admitted inert volume.

7. An internal combustion engine having four cylinders arranged in two wings that are angularly disposed relative to each other, one combustion cylinder and one pumping cylinder forming a cycle unit in each wing, with the combustion cylinder occupying the engine front end position, a piston arranged for operation within each cylinder, a crank shaft having four cranks, one for each cylinder, each of the four cylinders being disposed on a separate center that is directly in the radial path of travel of a crank of said crank shaft and a connecting rod connecting each piston with a respective one of said four cranks.

8. An internal combustion engine having four cylinders arranged in two wings that are angularly disposed relative to each other, one combustion cylinder and one pumping cylinder forming a cycle unit in each wing with the combustion cylinder occupying the engine front end position, a piston arranged for operation within each cylinder, a crank shaft having four cranks, one for each cylinder, each of the four cylinders being disposed on a separate center that is directly in the radial path of travel of a crank of said crank shaft, a connecting rod connecting each piston with a respective one of said four cranks, and the four cranks of the crank shaft being arranged at equal distances apart throughout the circumference of the crank throw circle.

9. An internal combustion engine having four cylinders arranged in two wings that are angularly disposed relative to each other, one combustion cylinder and one pumping cylinder forming a cycle unit in each wing with the combustion cylinder occupying the engine front end position, a piston arranged for operation within each cylinder, a crank shaft having four cranks, one for each cylinder, each of the four cylinders being disposed on a separate center that is directly in the radial path of travel of a crank of said crank shaft, a connecting rod connecting each piston with a respective one of said four cranks, the first crank from one end being connected to the piston of the combustion cylinder in one wing, the second crank from the same end being connected to the piston of the combustion chamber of the other wing, the third crank being connected to the piston of the pumping cylinder in one wing and the fourth crank being connected to the piston of the pumping cylinder in the other wing.

10. An internal combustion engine having four cylinders arranged in two wings that are angularly disposed relative to each other, one combustion cylinder and one pumping cylinder forming a cycle unit in each wing with the combustion cylinder occupying the engine front end position, a piston arranged for operation within each cylinder, a crank shaft having four cranks, one for each cylinder, each of the four cylinders being disposed on a separate center that is directly in the radial path of travel or throw of a crank of said crank shaft, a connecting rod connecting each piston with a respective one of said four cranks, the first crank from one end being connected to the piston of the combustion cylinder in one wing, the second crank from the same end being connected to the piston of the combustion chamber of the other wing, the third crank being connected to the piston of the pumping cylinder in one wing, the fourth crank being connected to the piston of the pumping cylinder in the other wing, the first and second cranks being disposed 180° apart and the second and third cranks being disposed 180° apart and occupying a plane substantially at right angles to the plane occupied by the first and second cranks.

11. An internal combustion engine having four cylinders arranged in two pairs, each pair constituting one of two wings that form a V-structure, one of the cylinders of each wing being adapted for the combustion of gaseous fuel, the other cylinder of the same wing being adapted to charge pumping to the other or combustion cylinder of the same wing, the cylinders of each wing unit that are adapted for combustion, being located at one end of the V-structure and the charge pumping cylinders being located at the other end of said V-structure.

12. An internal combustion engine having four cylinders arranged in two pairs, each pair constituting one of two wings that form a V-structure, one of the cylinders of each wing being adapted for the combustion of gaseous fuel, the other cylinder of the same wing being adapted to charge pumping to the other or combustion cylinder of the same wing, the cylinders of each wing unit that are adapted for combustion being located at one end of the V-structure, the charge pumping cylinders being located at the other end of said V-structure, a crank shaft having four cranks, pistons arranged for operation within the four cylinders and connection from said pistons to the respective cranks.

13. An internal combustion engine having four cylinders arranged in two pairs, each pair constituting one of two wings that form a V-structure, one of the cylinders of each wing being adapted for the combustion of gaseous fuel, the other cylinder of the same wing being adapted to charge pumping to the other or combustion cylinder of the same wing, the cylinders of each wing unit that are adapted for combustion being located at one end of the V-structure, the charge pumping cylinders being located at the other end of said V-structure, a crank shaft having four cranks, pistons arranged for operation within the four cylinders, connection from said pistons to the respective cranks, the cranks to which the pistons of the combustion cylinders are connected being spaced 180° apart and the cranks to which the pistons of the pumping cylinders are connected being spaced 180° apart and disposed at right angles to the cranks to which the combustion cylinder pistons are connected.

14. An internal combustion engine having two units, each comprising a combustion cylinder and a two diameter bore pumping cylinder, the two units being angularly disposed with relation to each other so as to form a V-structure, a crank shaft having four cranks, the axes of said cylinders being radial to said crank shaft, the axes of the two cylinders in each unit occupying planes that are coincident with the axis of the crank shaft, a piston arranged for operation within each of the four cylinders, and connections between said pistons and the respective cranks of the crank shaft, which connections are arranged so that the piston in the pumping cylinder of each unit is connected to a crank that is substantially 90° in advance in the direction of crank shaft rotation, of the crank to which the combustion cylinder piston of the same unit is connected.

15. An internal combustion engine having two units, each comprising a combustion cylinder and a two diameter bore pumping cylinder, the two units being angularly disposed with relation to each other so as to form a V-structure, a crank shaft having four cranks, the axes of said cylinders being radial to said crank shaft, the axes of the two cylinders in each unit occupying planes that are coincident with the axis of the crank shaft, a piston arranged for operation within each of the four cylinders, connections between said pistons and the respective cranks of the crank shaft, which connections are arranged so that the piston in the pumping cylinder of each unit is connected to a crank that is substantially 90° in advance in the direction of crank shaft rotation, of the crank to which the combustion cylinder piston of the same unit is connected, means for admitting an inert charge volume to each pumping cylinder, means for admitting gaseous fuel to each pumping cylinder, means for admitting gaseous fuel from each pumping cylinder to its companion combustion cylinder and each combustion cylinder being provided with an exhaust port and with a compressed inert volume inlet port.

16. In an internal combustion engine, a pair of combustion cylinders, a pair of pumping cylinders, the two pairs of cylinders being arranged to form a V-structure with one pumping cylinder being disposed behind and functioning for one of the combustion cylinders, a four throw crank shaft, pistons arranged for operation within said cylinders, and connected to the cranks of the crank shaft means for admitting gaseous fuel to the pumping cylinders, means for admitting inert charge volumes to said pumping cylinders, means for admitting compressed gaseous fuel from each pumping cylinder to its companion combustion cylinder, and each combustion cylinder being provided with an exhaust port and with a compressed inert volume admission port.

In testimony whereof I affix my signature.

EVERETT R. BURTNETT.